(12) United States Patent
Masumoto et al.

(10) Patent No.: US 8,310,212 B2
(45) Date of Patent: Nov. 13, 2012

(54) CONTROL DEVICE FOR AUTOMOBILE BATTERY-CHARGING GENERATOR

(75) Inventors: Shoju Masumoto, Hitachiohta (JP);
Hiroshi Yoneda, Hitachinaka (JP);
Makoto Hirama, Hitachinaka (JP);
Shuichi Kokubun, Naka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 646 days.

(21) Appl. No.: 12/571,821

(22) Filed: Oct. 1, 2009

(65) Prior Publication Data

US 2010/0085023 A1 Apr. 8, 2010

(30) Foreign Application Priority Data

Oct. 2, 2008 (JP) ................................. 2008-257770

(51) Int. Cl.
*H02P 9/00* (2006.01)
(52) U.S. Cl. .......................................... 322/28; 322/59
(58) Field of Classification Search ..................... 322/24, 322/25, 27, 28, 37, 59
See application file for complete search history.

(56) References Cited

U.S. PATENT DOCUMENTS

| | | | | |
|---|---|---|---|---|
| 5,262,711 A * | 11/1993 | Mori et al. | ....................... | 322/28 |
| 5,483,146 A * | 1/1996 | Schultz et al. | ..................... | 322/7 |
| 5,719,487 A * | 2/1998 | Sato et al. | ........................ | 322/28 |
| 5,731,689 A * | 3/1998 | Sato | ................................ | 322/25 |
| 6,346,797 B1 * | 2/2002 | Perreault et al. | ................. | 322/29 |
| 6,426,609 B2 * | 7/2002 | Tanaka et al. | .................... | 322/19 |
| 6,803,748 B2 * | 10/2004 | Peter | ............................... | 322/29 |
| 7,009,365 B1 * | 3/2006 | Namuduri et al. | ............... | 322/23 |
| 7,728,561 B2 * | 6/2010 | Okuno | ............................. | 322/37 |
| 7,919,949 B2 * | 4/2011 | Namuduri et al. | ............... | 322/24 |
| 8,138,729 B2 * | 3/2012 | Konishi | ........................... | 322/28 |

FOREIGN PATENT DOCUMENTS

JP 8-236672 A 9/1996

* cited by examiner

*Primary Examiner* — Nicholas Ponomarenko
(74) *Attorney, Agent, or Firm* — Crowell & Moring LLP

(57) ABSTRACT

This invention provides a control device for automobile battery-charging generators, adapted to supply a plurality of sets of specifications in a highly reliable and stable form by simple switching between electrical characteristics assigning and limiting functions so as to meet various needs of users. In accordance with a voltage of a battery B, a voltage control IC regulator 120 controls a field current flowing through a field winding FL. The voltage control IC regulator 120 has a plurality of functions for assigning electrical characteristics limits or electrical characteristics beforehand. The voltage control IC regulator 120 also has switch terminals SW1 and SW2 that switch the plurality of functions that assign the electrical characteristics limits or the electrical characteristics. Electric potential levels of the switch terminals SW1 and SW2 can be changed by cutting cutoff portions CP1 and CP2 of an intermediate terminal 150 or leaving these cutoff portions connected. Thus, an effective or ineffective state of the functions that assign the electrical characteristics limits or the electrical characteristics can be switched.

7 Claims, 9 Drawing Sheets

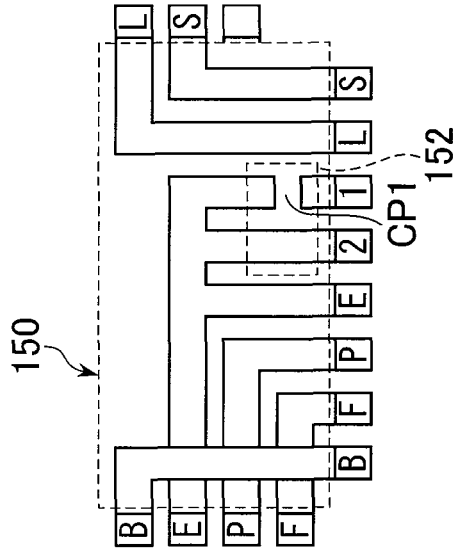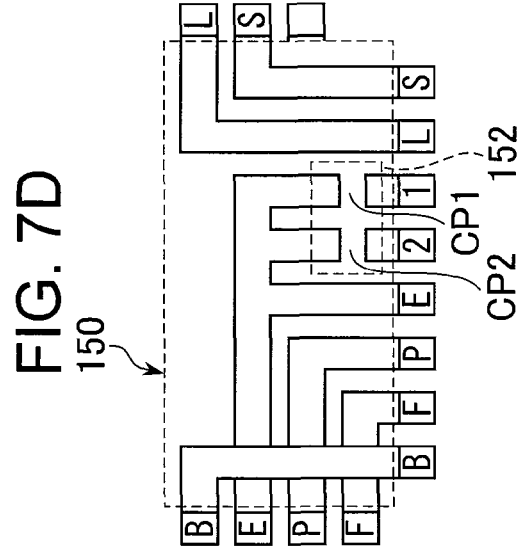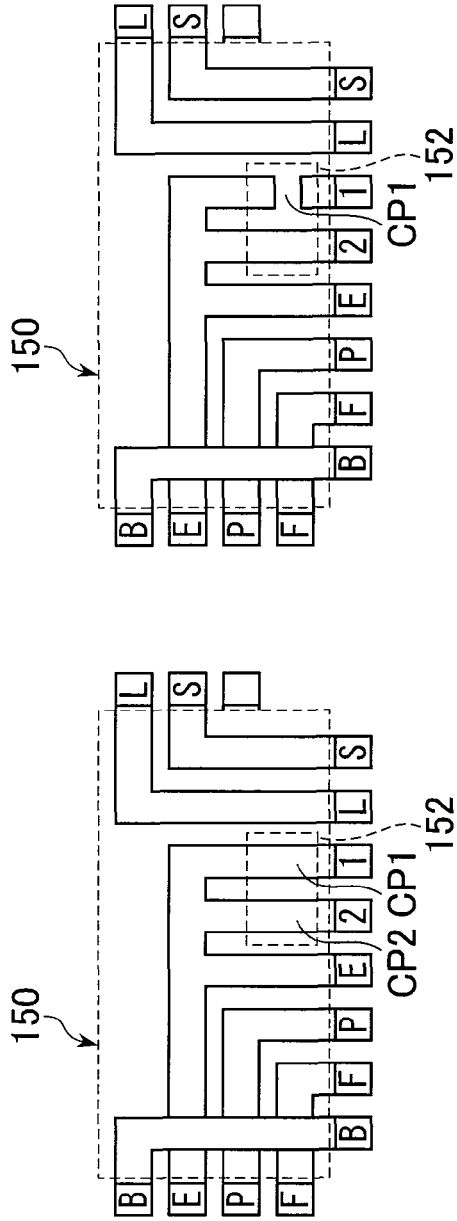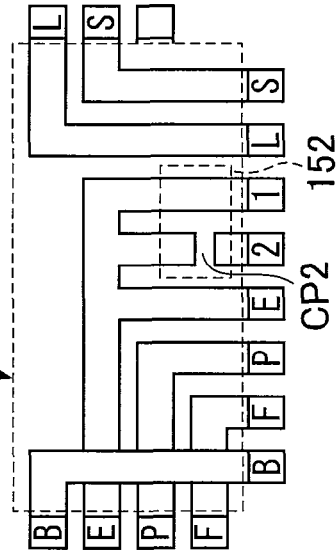

CONTROL DEVICE FOR AUTOMOBILE BATTERY-CHARGING GENERATOR

BACKGROUND OF THE INVENTION

1. Field of the Invention

The present invention relates generally to control devices for automobile battery-charging generators. More particularly, the invention concerns a control device for automobile battery-charging generators, suitable for use with a single-chip IC regulator including a control circuit formed on one semiconductor element.

2. Description of the Related Art

Conventional control devices for automobile battery-charging generators are each disposed at the axial lateral position of a rotor or stator, inside the housing of the automobile battery-charging generator. Since the geometries and output performance of each automobile battery-charging generator vary according to the particular needs of the user, the control devices for the automobile battery-charging generators also need to vary in the shape of a casing. In addition, the control devices for the automobile battery-charging generators need to vary according to the particular needs of the user.

In connection with the above, there is a method for achieving an electronic component applicable as one that is less expensive and capable of meeting diverse needs. For example, a surface-mounted packaged semiconductor electronic component manufactured using such a method so that connections can be changed by forming on a package beforehand a lead frame having various wiring patterns, and then cutting the desired section of that lead frame, is traditionally known (refer to JP-A-8-236672, for example).

In addition, consumer electronic components with an electrically reprogrammable EEPROM mounted on a semiconductor element beforehand so that the electrical characteristics of the semiconductor element can be changed from outside are generally known.

SUMMARY OF THE INVENTION

The method described in JP-A-8-236672, however, only allows connections to be changed. A function that switches the electrical characteristics limits or electrical characteristics preset for the integrated circuit, therefore, is not obtainable. Additionally, cutting the desired section of the lead frame of the packaged semiconductor electronic component poses a problem in that the number of package product models increases.

Furthermore, for use as a control device for an automobile battery-charging generator, the components whose electrical characteristics can be changed from outside using the EEPROM cannot be adopted for the following reasons. That is to say, control devices for automobile battery-charging generators are commonly installed in an internal-combustion engine room. The temperature inside the internal-combustion engine room becomes high. In addition, rotation of the control device increases the temperature itself of the generator. As a result, the control device is exposed to the environment of an extremely high temperature that is created by the temperature of the internal-combustion engine room and that of the automobile battery-charging generator. However, since it is impossible to use the EEPROM under the environment of such a high temperature, if the EEPROM is used in the control device for the automobile battery-charging generator, the device will decrease in reliability.

An object of the present invention is to provide a control device for automobile battery-charging generators, adapted to supply a plurality of sets of specifications in a highly reliable and stable form by simple switching between electrical characteristics assigning and limiting functions so as to meet various needs of users.

(1) In order to attain the above object, one aspect of the present invention is a control device for an automobile battery-charging generator, the control device being used in conjunction with the charging generator that includes a field winding which creates a rotating magnetic field by spinning synchronously with rotation of an internal-combustion engine, and an armature winding influenced by the field winding to generate an electric current. The control device includes a rectifier for rectifying alternating-current power generated in the armature winding, and voltage-regulating means for controlling a field current flowing through the field winding, in response to a voltage of a battery charged by direct-current power resulting from the rectification by the rectifier. The voltage-regulating means has a function that assigns a plurality of electrical characteristics limits or electrical characteristics beforehand. The voltage-regulating means also includes a switch terminal to select whether the function that assigns the plurality of electrical characteristics limits or electrical characteristics is to be made effective or ineffective.

(2) In above item (1), the switch terminal is preferably adapted to take one of two electric potential levels, thereby selecting whether the electrical characteristics limits or the electrical characteristics are to be executed.

(3) In item (1), the switch terminal is preferably provided in at least two places, in which case, combining the two electric potential levels of each of the switch terminals switches the electrical characteristics limits or the electrical characteristics appropriately according to the particular number of combinations.

(4) In item (1), the switch terminal is preferably integrated in an insulator-isolated integrated circuit or in an integrated circuit with bipolar, C-MOS, and D-MOS regions formed as a single block.

(5) In item (1), the control device for the automobile battery-charging generator preferably includes a single in-line package having connection terminals arranged at one side of the package so as to include the switch terminal, in which case, voltage-regulating means of the single in-line package is connected to a holder via an intermediate terminal. The intermediate terminal is formed using an insert-molded package having connection terminals arrayed in at least two directions, the connection terminals in one of the two directions being connected to the connection terminals of the voltage-regulating means of the single in-line package, and the connection terminals in the other direction being connected to connection terminals of the holder. In this way, the connection terminals of the holder are connected to the battery, the field winding, and a grounding section (GND).

(6) In above item (5), the intermediate terminal preferably has an opening with a portion of each connection terminal exposed therein, in part of the insert-molded package. The electric potential of the switch terminal for switching the electrical characteristics limits or the electrical characteristics is changeable from a first level to a second one by cutting the appropriate connection terminal within the opening.

(7) In above item (5), the intermediate terminal preferably has the above connection terminals in three directions on an outer surface of the insert-molded package, with the connection terminals at both ends of the intermediate terminal being connected to the connection terminals of the holder, and with the remaining connection terminals being connected to the connection terminals of the voltage-regulating means of the single in-line package.

BRIEF DESCRIPTION OF THE DRAWINGS

FIGS. 7A to 7D are plan views that show different wiring patterns of the intermediate terminal used in the automobile battery-charging generator control device of the present embodiment;

DESCRIPTION OF THE PREFERRED EMBODIMENTS

Hereunder, circuit composition and operation of a control device for controlling an automobile battery-charging generator according to an embodiment of the present invention will be described with reference to FIGS. 1 to 10.

First, the circuit composition of the automobile battery-charging generator control device according to the present embodiment is described below with reference to FIGS. 1 and 2.

Figure 1:
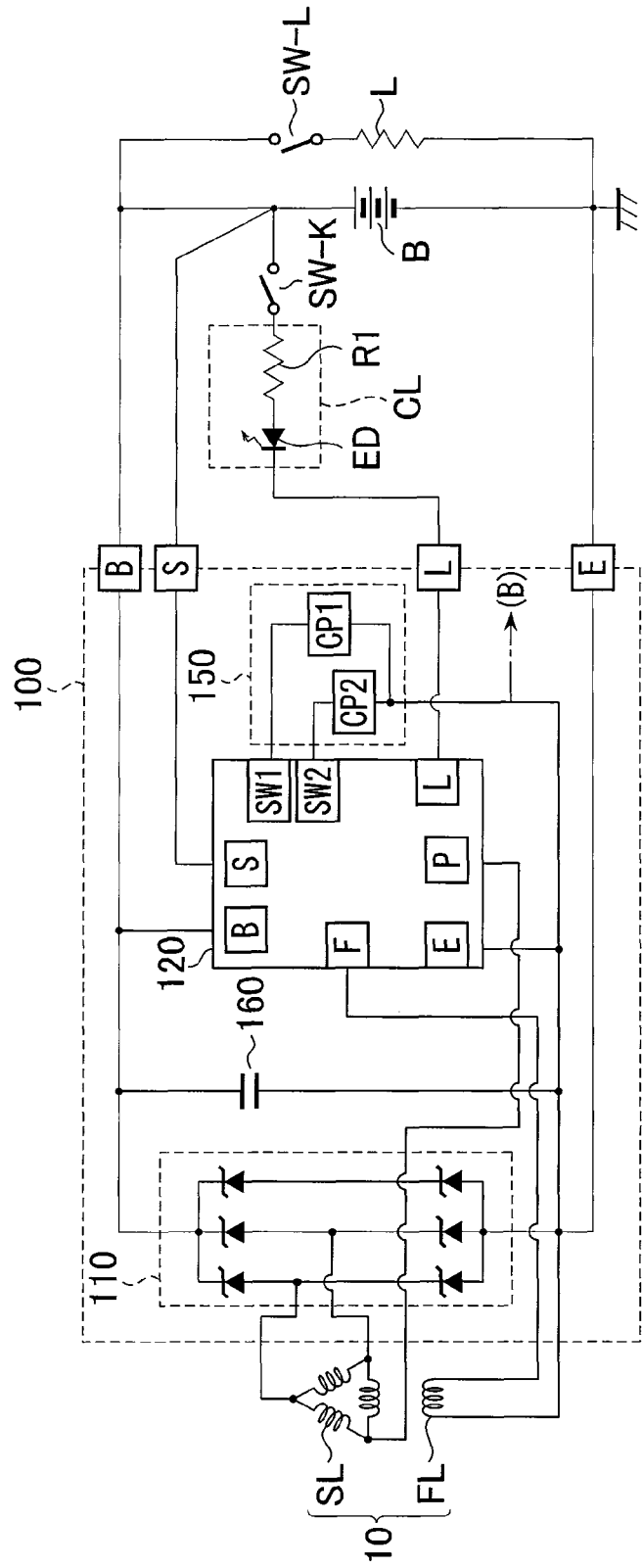
FIG. 1 is a circuit composition diagram of an automobile battery-charging generator control device according to an embodiment of the present invention.

FIG. 1 is a circuit composition diagram of the automobile battery-charging generator control device according to the present embodiment. FIG. 2 is a circuit composition diagram of an IC regulator used in the automobile battery-charging generator control device according to the present embodiment.

First, the circuit composition of the automobile battery-charging generator control device according to the present embodiment is described below with reference to FIG. 1.

The control device 100 for an automobile battery-charging generator includes a full-wave rectifying diode 110 connected to an armature winding SL of the automobile battery-charging generator 10. The armature winding SL includes three delta-connected coils. The automobile battery-charging generator 10 has its stator rotated by an internal-combustion engine, thereby developing AC power across the armature winding SL. The full-wave rectifying diode 110 is composed of six power Zener diodes, two interconnected in series in each of three parallel rows. The full-wave rectifying diode 110 conducts full-wave rectification of the AC power developed across the armature winding SL.

The control device 100 further includes a voltage control IC regulator 120, an intermediate terminal 150, and a noise reduction film capacitor 160.

The voltage control IC regulator 120 has its control unit and its power-driving unit formed as a single-IC structure. In addition to terminals B, E, F, L, P, and S, the voltage control IC regulator 120 includes terminals SW1 and SW2.

The terminal B of the voltage control IC regulator 120 is connected to an external battery B via a terminal B of the control device 100. The DC power that has been generated by the rectification with the full-wave rectifying diode 110 is stored into the battery B. The DC power in the battery B is supplied to an electrical load L via an electrical load switch SW-L. The DC power in the battery B is also supplied as supply power to the voltage control IC regulator 120 via the terminal B of the control device 100 and the terminal B of the voltage control IC regulator 120.

The terminal S of the voltage control IC regulator 120 is connected to a positive-electrode terminal of the battery B, thus introducing a voltage of the battery B into the voltage control IC regulator 120. The terminal F of the voltage control IC regulator 120 is connected to a field winding FL of the automobile battery-charging generator 10. The voltage control IC regulator 120 controls via the terminal F a field current flowing through the field winding FL, and thus controls a voltage generated by the automobile battery-charging generator 10. The terminal E of the voltage control IC regulator 120 is electrically grounded.

The terminal P of the voltage control IC regulator 120 is connected to the armature winding SL of the automobile battery-charging generator 10 in order to introduce the generated voltage of the charging generator 10 into the voltage control IC regulator 120. The voltage that has been developed across the armature winding is input from the terminal P and then used for the voltage control IC regulator 120 to judge whether the charging generator 10 has started power generation.

The terminal L of the voltage control IC regulator 120 is connected to a charge lamp CL. The charge lamp CL includes a light-emitting diode ED and a resistor R1. The charge lamp CL is connected to a key switch SW-K, and lights up when the key switch SW-K is activated. The charge lamp CL goes out to indicate that after the start of power generation by the charging generator, the voltage control IC regulator 120 has interrupted supply of a current to the charge lamp CL connected to the terminal L.

The SW1 and SW2 terminals of the voltage control IC regulator 120 are grounded via the intermediate terminal 150. The intermediate terminal 150 includes cutoff portions CP1 and CP2. When the cutoff portion CP1 is in an electrical conducting condition, the SW1 terminal is maintained at a grounding potential, and when the cutoff portion CP1 is cut, the SW1 terminal is maintained at an open-circuit potential. The same also applies to the cutoff portion CP2. That is to say, the switch terminals SW1 and SW2 take one of two potential levels, thus determining whether the electrical characteristics limits or the electrical characteristics are to be made effective or ineffective.

The present embodiment includes the intermediate terminal 150 having the cutoff portions CP1, CP2, and forms one of two voltage states of the voltage control IC regulator 120, depending upon whether the cutoff portion CP1 is in the electrical conducting state or cut. Depending upon the voltage level of the SW1 terminal, the voltage control IC regulator 120 selects the electrical characteristics limits or electrical characteristics provided in advance. The same also applies to the SW2 terminal. As shown in the example of FIG. 1, the SW1 terminal is connected to obtain the grounding potential via the intermediate terminal 150. Alternatively, however, the SW1 terminal may, as denoted by an alternate short and long dashed line, be connected to the terminal B to which the battery voltage is supplied. In the latter case, under the conducting state of the cutoff portion CP1, the battery voltage is applied to the SW1 terminal, and under the cut status of the cutoff portion CP1, the open-circuit potential is applied to the SW1 terminal. Thus, the SW1 terminal can take two potential levels.

Next, circuit composition of the voltage control IC regulator 120 used in the automobile battery-charging generator control device according to the present embodiment is described below with reference to FIG. 2.

The voltage control IC regulator 120 includes a voltage control unit 122, an internal-voltage generator 124, an SW1 terminal state determination unit 126, an SW2 terminal state determination unit 128, power MOS transistors SW-F, SW-Lp, and a flywheel diode D1. The voltage control IC regulator 120 is of dielectric-isolated semiconductor structure, so the regulator has its power element section and its control unit mounted on one semiconductor substrate. The voltage control IC regulator 120 can be of insulator-isolated integrated circuit composition with a dielectric-isolated semiconductor, or can be of integrated circuit composition with bipolar, C-MOS, and D-MOS regions formed as a single block.

On the basis of the voltage of the battery B (shown in FIG. 1) that is detected from the terminal S, and the generated voltage of the charging generator 10 (also, shown in FIG. 1) that is detected from the terminal P, the voltage control unit 122 controls an on/off state of the power MOS transistor SW-F, thus controlling the field current supplied from the terminal F to the field winding FL shown in FIG. 1. Additionally, the voltage control unit 122 controls an on/off state of the power MOS transistor SW-Lp, thus controlling the voltage supplied from the terminal L to the charge lamp CL shown in FIG. 1, and controlling the on/off state of the charge lamp CL.

The internal-voltage generator 124 has a resistor 124a, smoothing capacitor 124b, resistor 124c, and Zener diode 124d connected, as shown, to generate an internal voltage VCC of the IC. The internal voltage VCC is used as an operating voltage for the voltage control unit 122, the SW1 terminal state determination unit 126, and the SW2 terminal state determination unit 128.

The SW1 terminal state determination unit 126 is composed of resistors 126a, 126b, a reference power supply 126c, a comparator 126d, and a determination circuit 126e that judges for connection of the SW1 terminal to GND and then transmits judgment results to the voltage control unit 122.

The SW2 terminal state determination unit 128 is composed of resistors 128a, 128b, a reference power supply 128c, a comparator 128d, and a determination circuit 128e that judges for connection of the SW2 terminal to GND and then transmits judgment results to the voltage control unit 122.

The voltage control unit 122 selects electrical characteristics limits or electrical characteristics, depending upon the judgment results by the SW1 terminal state determination unit 126 or the SW2 terminal state determination unit 128.

Next, structure of an automobile battery-charging generator with the control device of the present embodiment is described below with reference to FIG. 3.

Figure 3:
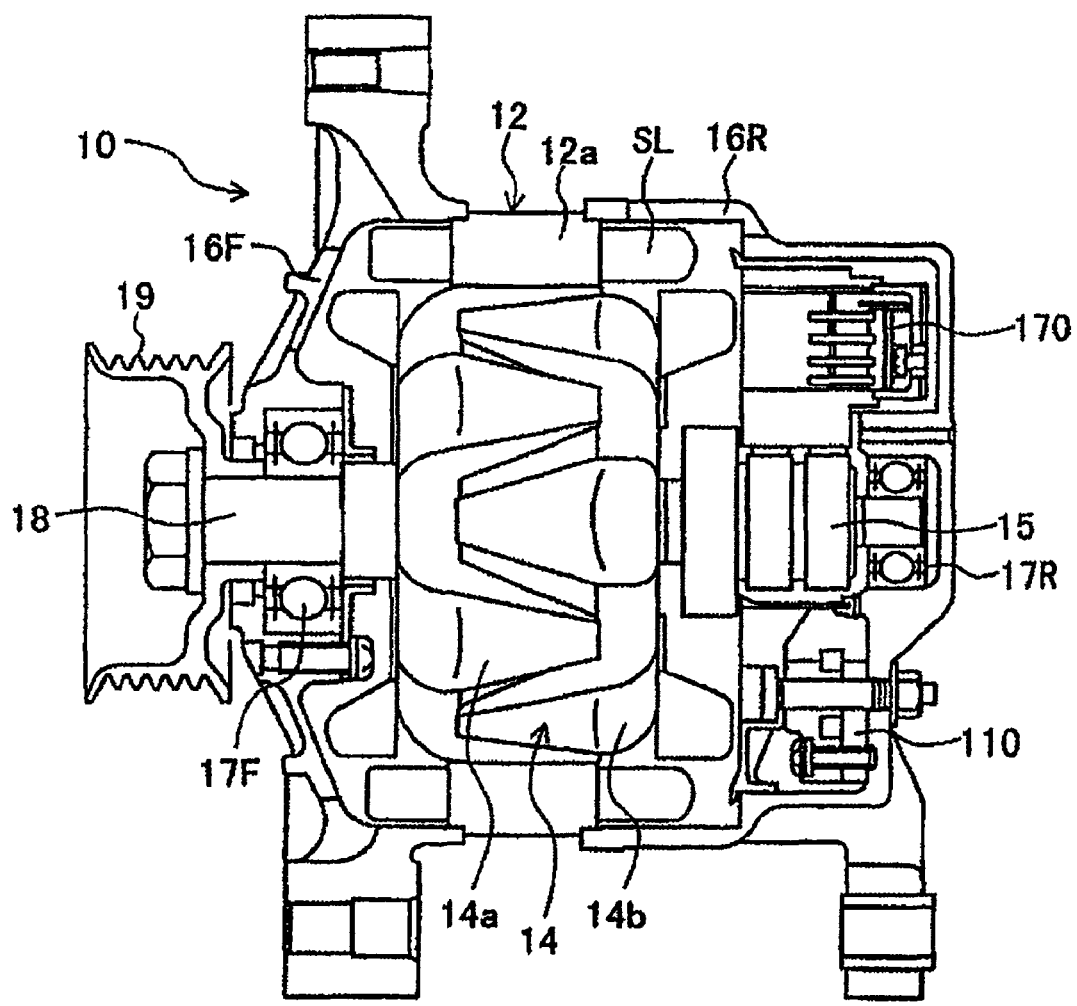
FIG. 3 is a partial, sectional view showing longitudinally an automobile battery-charging generator structure including the control device of the present embodiment.

FIG. 3 is a partial, sectional view showing longitudinally the automobile battery-charging generator structure including the control device of the present embodiment.

The automobile battery-charging generator 10 includes a stator 12 and a rotor 14. The stator 12 is fixed to inner-surface sides of a front housing 16F and a rear housing 16R. The stator 12 includes a stator core 12a and an armature winding SL wound around the stator core 12a.

The rotor 14 is fixed to a shaft 18. The shaft 18 has one section mounted in the front housing 16F so as to be rotatable via a bearing 17F, and has another section mounted in the rear housing 16R so as to be rotatable via a bearing 17R. In addition, the shaft 18 has a pulley 19 at one end thereof. The pulley 19 is connected to an internal-combustion engine to transmit rotational driving force of the engine. Therefore, the rotor 14 is rotationally driven by the internal-combustion engine. The rotor 14 includes one pair of claw-shaped magnetic pole pieces, 14a and 14b. Claws of the claw-shaped magnetic pole pieces 14a, 14b are shifted in respective spinning directions and face each other. The field winding FL shown in FIG. 1 is wound around inner surfaces of the claw-shaped magnetic pole pieces 14a, 14b.

The full-wave rectification diode 110 shown in FIG. 1 is mounted at an inner-surface side of the rear housing 16R. The full-wave rectification diode 110 is connected to the armature winding SL.

An IC casing 170 is also mounted at the inner-surface side of the rear housing 16R. The IC casing 170 contains carbon brushes as well as the voltage control IC regulator 120, intermediate terminal 150, and noise reduction film capacitor 160 shown in FIG. 1. The shaft 18 has slip rings 15 mounted thereon. The terminal F of the voltage control IC regulator 120 is connected to the field winding FL wound around the inner surfaces of the claw-shaped magnetic pole pieces 14a, 14b, via the carbon brushes and the slip rings 15.

Figure 2:
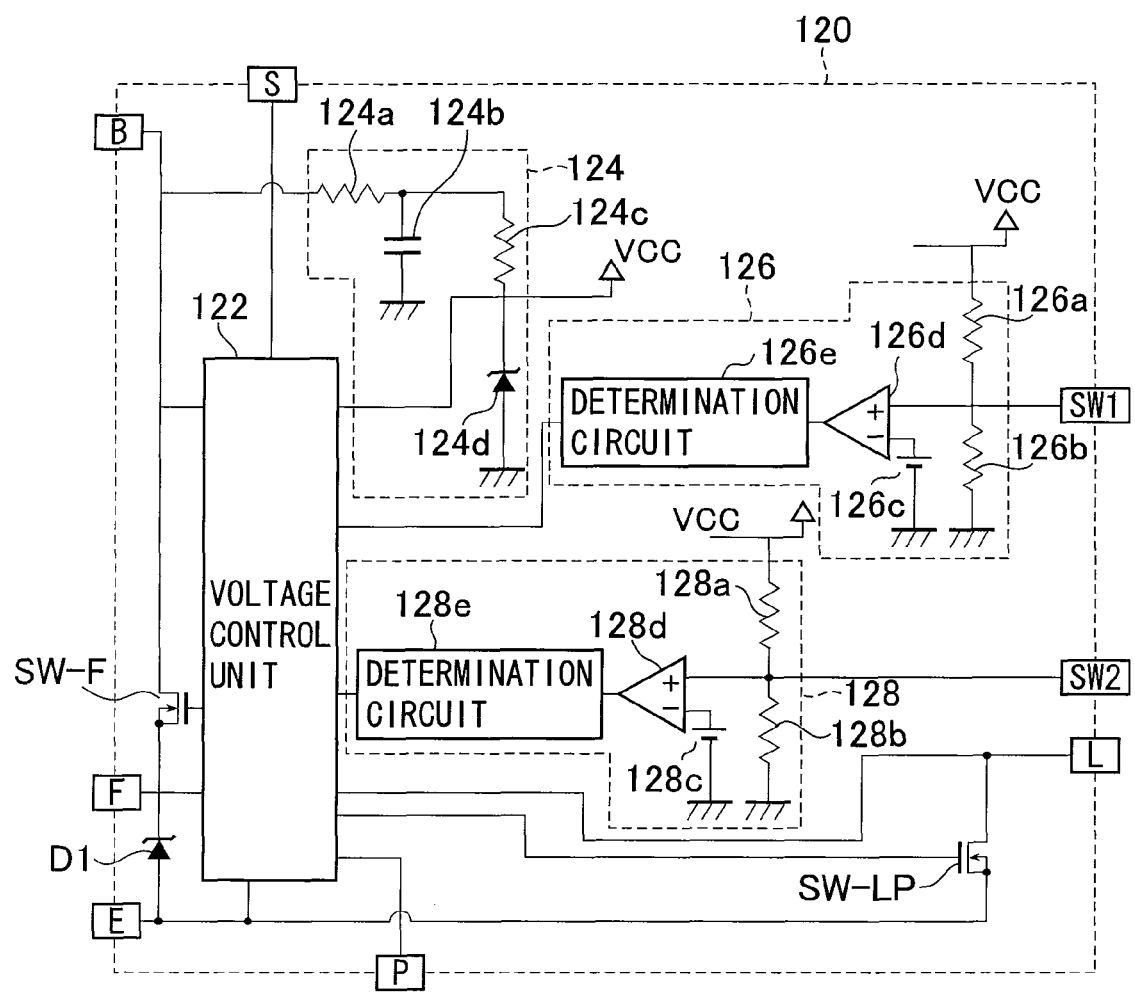
FIG. 2 is a circuit composition diagram of an IC regulator used in the automobile battery-charging generator control device according to the present embodiment.

Next, operation of the control device 100 for the automobile battery-charging generator, shown in FIGS. 1 to 3, is described below.

The field winding FL mounted on the rotor 14 of FIG. 3 generates a rotating magnetic field by spinning synchronously with internal-combustion engine rotation. The flywheel diode D1 shown in FIG. 2 is connected in parallel to the field winding FL in order to absorb any switching noise occurring during switching of the power MOS transistor SW-F.

The armature winding SL wound around the stator core 12 opposed with an airgap to the rotor 14 in FIG. 3 outputs an AC voltage signal according to a magnitude of the rotating magnetic field created by the field winding FL. This AC output voltage signal is full-wave rectified by the power Zener rectification diodes constituting the three-phase full-wave rectifier 110 shown in FIG. 1.

The three-phase full-wave rectifier 110 has its output signal supplied to the battery B via the terminal B, thus charging the battery B. At the same time, the output signal from the three-phase full-wave rectifier 110 is also supplied from the terminal B via a load switch SW-L to an electrical load L such as a lamp. In addition, the battery B is connected to the internal-voltage generator 124 that forms part of the power supply of the voltage control IC regulator 120, and the internal-voltage generator 124 receives an output signal from the battery B and generates a constant voltage VCC.

The voltage control unit 122 controls the generator output voltage to the constant voltage by detecting the battery voltage from the terminal S and then controlling the current flowing through the field winding FL.

When the key switch SW-K is closed, the power MOS transistor SW-Lp turns on to light up the charge lamp CL. The voltage control unit 122 detects the AC waveform that the armature winding SL generates at the terminal P, and thus detects, from this AC waveform, a speed at which the rotor 14 shown in FIG. 3 spins synchronously with the rotation of the internal-combustion engine. When the internal-combustion engine speed is greater than 0 but up to an idling speed, the voltage control unit 122 turns off the power MOS transistor SW-Lp, deactivating the charge lamp CL to notify that the charging generator has started generating power.

In addition to the above functions, the voltage control unit 122 has the functions described below. That is to say, the voltage control unit 122 also has a load-responsive control (LRC) function, which, during generator output voltage control to a constant level, slowly increases the field current to avoid sudden loading of the internal-combustion engine. Without the LRC function, if a heavy electrical load L is applied, the voltage control unit 122 will instruct the field winding FL to immediately increase the field current so that the charging generator can supply a current commensurate with the electrical load. A consequent abrupt increase in driving torque of the rotor will result in the internal-combustion engine being abruptly loaded via a belt. Abrupt internal-combustion engine loading will, in turn, cause unstable internal-combustion engine rotation, particularly during idling at low engine speed, resulting in uncomfortable engine vibration. In the worst case, the rotation of the internal-combustion engine will stop.

The LRC function is effective for stabilizing the internal-combustion engine speed during abrupt changes in idling electrical load. Meanwhile, since the field current will be increased slowly, while the LRC function is working, a current great enough to respond to the electrical load called for will not be supplied, which will result in the battery voltage being reduced.

Accordingly, for users of the vehicle models generating a large internal-combustion engine torque, since engine rotational malfunction originally does not occur, the user may avoid providing the LRC function to minimize voltage decreases due to use of the LRC function. Conversely, users of the vehicle models of a small internal-combustion engine torque may provide the LRC function to avoid engine rotational malfunction.

In addition, the voltage control unit 122 has an overcharge alarm function, which, at a battery voltage exceeding a defined level (e.g., 16 V or more), judges the battery to be overcharged and turns on the power MOS transistor SW-Lp to activate the charge lamp CL and thus to alarm a user about the overcharge. Furthermore, the voltage control unit 122 has a terminal disconnection alarm function that upon detecting a voltage detection terminal-S voltage decrease (usually to 12 V or less) due to terminal-S electrical disconnection at the vehicle side, turns on the power MOS transistor SW-Lp and activates the charge lamp CL to alarm the user about the disconnection. In the event of the terminal-S electrical disconnection, the voltage control unit 122 controls the battery-charging voltage to a constant level by switching the voltage detection terminal to the terminal B, in addition to delivering the above alarm.

The terminal S is connected to a neighboring section of the battery, on a wiring route of the vehicle from the charging generator. This connection allows for more accurate voltage detection in the neighborhood of the battery.

The vehicle wiring occasionally includes an intermediate connecting coupler in one to three places. In that case, internal-combustion engine vibration at each intermediate connection is prone to improper contact due to instantaneous disconnection, and if the instantaneous disconnection actually happens, the terminal disconnection alarm function will operate. Such an event will make the user uncomfortable, and any efforts to investigate causes will usually be in vain. Other users may therefore consider the terminal disconnection alarm to be unnecessary if the vehicle has a function that controls the battery-charging voltage to a constant level by switching the voltage detection terminal that is an auxiliary detector for the terminal-S disconnection, to the terminal B, and as a result, these users may avoid providing the terminal disconnection alarm function.

For these reasons, needs of users vary from user to user or according to situation. In order to meet various needs of the user, therefore, the present embodiment contains a switch that selects either making effective the functions provided beforehand in the integrated circuit composed of a dielectric-isolated semiconductor, or limiting those functions. The LRC function, the overcharge alarm function, and the terminal disconnection alarm function are provided in the voltage control unit 122 of the voltage control IC regulator 120 beforehand. The use or limitation of these functions can be selected by switching the selector switch.

Operation of the SW1 terminal is described below using the circuit diagram shown in FIG. 2. When the SW1 terminal is open (cut), a voltage divided by the resistors 126a and 126b directly connected from a supply line of the supply voltage VCC is developed at the SW1 terminal. For example, if the resistor 126a has a resistance of 10 kΩ, the resistor 126b has a resistance of 50 kΩ, and the supply voltage VCC is 5 V, then the voltage of SW1 is 4.17 V.

If a reference voltage 126c at a minus-side input terminal of the comparator 126d is 2 V, the comparator 126d assigns priority to a plus-side input terminal and outputs a "High" signal. The "High" signal is input to the determination circuit 126e. When its input is the "High" signal, the determination circuit 126e does not output an LRC function limiting (inhibiting) signal to the voltage control unit 122.

When the SW1 terminal is connected to GND next time, since the voltage on the plus-side input terminal of the comparator 126d becomes substantially equal to 0 V, the comparator 126d outputs a "Low" signal. When the input to the determination circuit 126e is the "Low" signal, the determination circuit 126e outputs the LRC function limiting (inhibiting) signal to the voltage control unit 122. The voltage control unit 122 consequently limits (inhibits) the LRC function.

Operation of the SW2 terminal is described below using the circuit diagram shown in FIG. 2. When the SW2 terminal is open (cut), a voltage divided by the resistors 128a and 128b directly connected from the supply line of the supply voltage VCC is developed at the SW2 terminal. If the resistor 128a has a resistance of 10 kΩ, the resistor 128b has a resistance of 50 kΩ, and the supply voltage VCC is 5 V, then the voltage of SW2 is 4.17 V. If a reference voltage 128c at a minus-side input terminal of the comparator 128d is 2 V, the comparator 128d assigns priority to a plus-side input terminal and outputs a "High" signal. The "High" signal is input to the determination circuit 128e. When its input is the "High" signal, the determination circuit 128e does not output a terminal-S disconnection alarm limiting (inhibiting) signal to the voltage control unit 122.

When the SW2 terminal is connected to GND next time, since the voltage on the plus-side input terminal of the comparator 128d becomes substantially equal to 0 V, the comparator 128d outputs a "Low" signal. When the input to the determination circuit 128e is the "Low" signal, the comparator 128d outputs the terminal-S disconnection alarm limiting (inhibiting) signal to the voltage control unit 122. The voltage control unit 122 consequently limits (inhibits) the terminal-S disconnection alarm function.

Next, structure of the voltage control IC regulator 120 used in the automobile battery-charging generator control device according to the present embodiment is described below with reference to FIG. 4.

Figure 4:
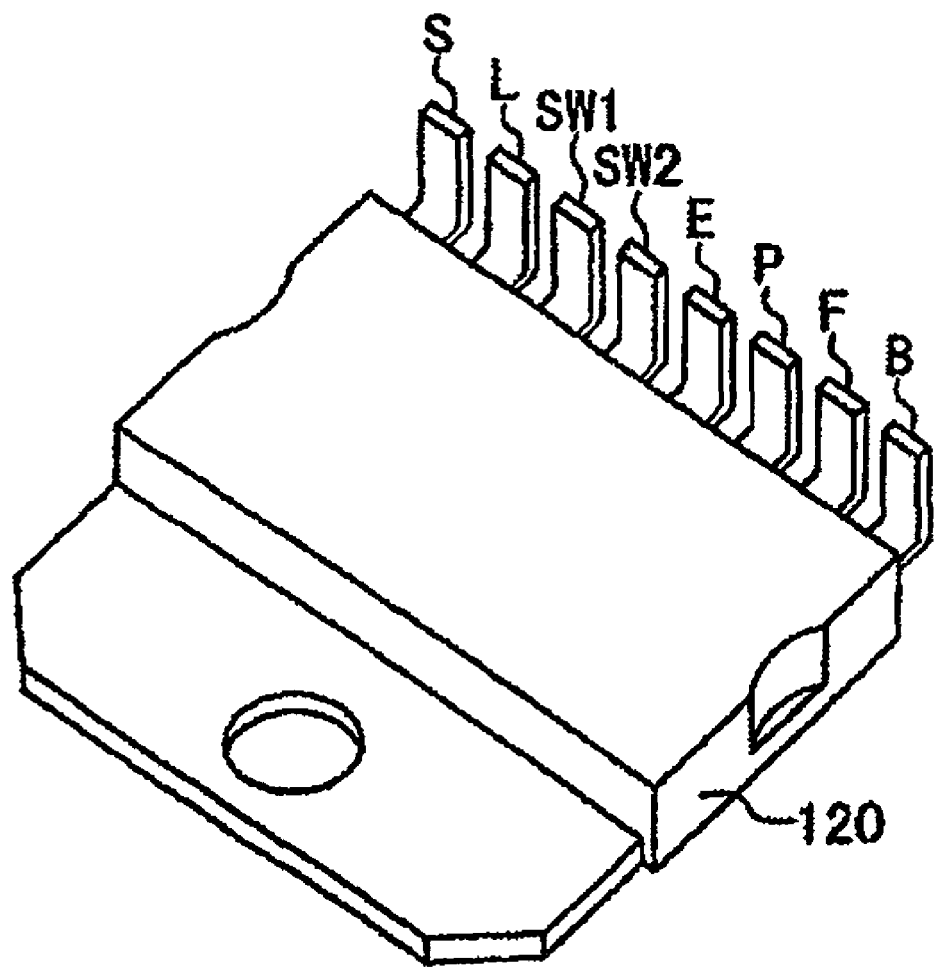
FIG. 4 is a perspective view that shows structure of the voltage control IC regulator used in the automobile battery-charging generator control device of the present embodiment.

FIG. 4 is a perspective view showing the structure of the voltage control IC regulator used in the automobile battery-charging generator control device of the present embodiment. The same reference numbers and symbols as used in FIGS. 1 and 2 denote the same elements.

The voltage control IC regulator 120 has a single in-line package structure (in FIG. 4, rectangular) in which an integrated circuit composed of a dielectric-isolated semiconductor is mounted in a molded package with eight terminal pins. The integrated circuit itself is coated with a molding resin after being connected to external terminals via aluminum wires or metallic wires.

As shown in FIG. 4, terminals S, L, SW1, SW2, E, P, F, and B are arranged in that order as the eight terminal pins. The SW1 terminal is an LRC function limiting (inhibiting) terminal, and the SW2 terminal is a terminal-S disconnection alarm limiting (inhibiting) terminal.

Next, structure of the automobile battery-charging generator control device 100 according to the present embodiment is described below with reference to FIG. 5.

Figure 5:
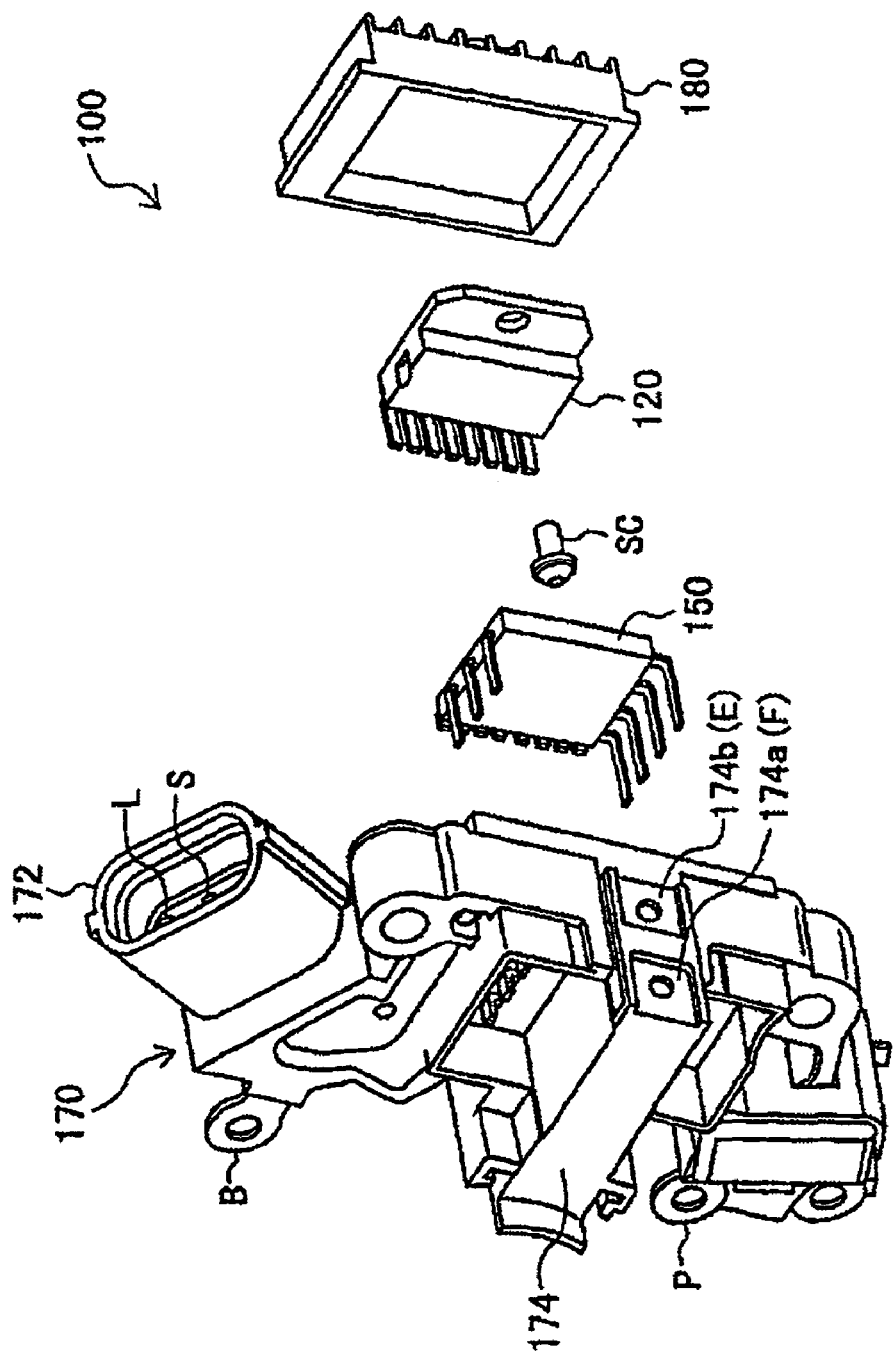
FIG. 5 is a perspective view that shows structure of the automobile battery-charging generator control device of the present embodiment.

FIG. 5 is a perspective view showing the structure of the automobile battery-charging generator control device of the present embodiment. The same reference numbers and symbols as used in FIGS. 1 and 2 denote the same elements.

The automobile battery-charging generator control device 100 includes an IC casing 170, an intermediate terminal 150, a voltage control IC regulator 120, and a heat sink 180.

The heat sink 180 is equipped to cool the voltage control IC regulator 120. The heat sink 180 is formed from an aluminum or copper material to prevent overheating of the voltage control IC regulator 120. The voltage control IC regulator 120 is fixed to the heat sink 180 by means of a screw SC.

The intermediate terminal 150 is disposed between the voltage control IC regulator 120 and the IC casing 170. The intermediate terminal 150 distinguishes by its internal terminal connections whether, before the terminal 150 is used, the SW1 and/or SW2 terminals of the voltage control IC regulator 120 are to be used in an open condition or connected to GND.

The IC casing 170 is a monoblock resin molding of a conductive bar, which is a wiring member. The IC casing 170 includes an external terminal connector (coupler) 172 for the automobile battery-charging generator. The coupler 172 contains terminals S and L for connection to the terminals S and L of the voltage control IC regulator 120, shown in FIG. 4. The IC casing 170 also contains terminals B and P for connection to the terminals B and P of the voltage control IC regulator 120, shown in FIG. 4. Additionally, a carbon brush storage box 174 is formed integrally in the IC casing 170. Carbon brushes 174*a* and 174*b* are stored within the carbon brush storage box 174. The carbon brush 174*a* acts as a terminal F equivalent to the terminal F of the voltage control IC regulator 120, shown in FIG. 4. The carbon brush 174*b* acts as a terminal E equivalent to the terminal E of the voltage control IC regulator 120, shown in FIG. 4. The carbon brushes 174*a*, 174*b* come into contact with the two respective slip rings 15 shown in FIG. 3, and can thus supply the field current to the field winding. The IC casing 170 further contains the noise reduction capacitor 160 shown in FIG. 1.

Next, structure for functional limitation in the automobile battery-charging generator control device according to the present embodiment is described below with reference to FIGS. 6 and 7.

Figure 6:
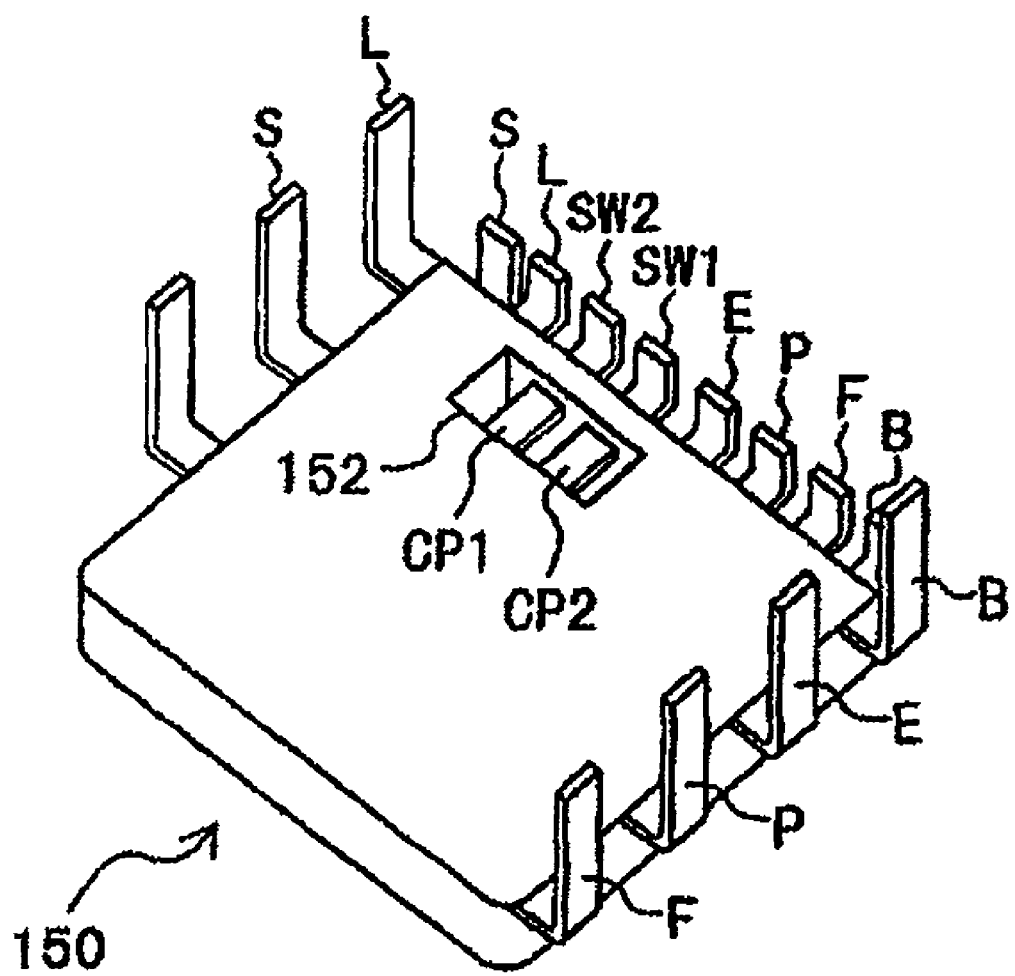
FIG. 6 is a perspective view showing an external shape of an intermediate terminal used in the automobile battery-charging generator control device of the present embodiment.

FIG. 6 is a perspective view showing an external shape of the intermediate terminal used in the automobile battery-charging generator control device of the present embodiment. FIG. 7 is a plan view that shows wiring structure of the intermediate terminal used in the automobile battery-charging generator control device of the present embodiment. The same reference numbers and symbols as used in FIG. 5 denote the same elements.

As shown in FIG. 6, the intermediate terminal 150 is a resin-molded component with 14 terminals. The 14 terminals of the intermediate terminal 150 are arranged on three sides. Eight terminals, namely, terminals S, L, SW1, SW2, E, P, F, and B, are arrayed in that order on a first side. This array is keyed to the terminals S, L, SW1, SW2, E, P, F, and B of the voltage control IC regulator 120, shown in FIG. 4. As shown in FIG. 5, therefore, S-to-S, L-to-L, SW1-to-SW1, SW2-to-SW2, E-to-E, P-to-P, F-to-F, and B-to-B terminal connections can be performed by welding after layout of the intermediate terminal 150 and the voltage control IC regulator 120.

Also, three terminals are arrayed on a second side. Two of the three terminals on the second side are the terminals L and S electrically connected to the terminals L and S on the first side. The remaining terminal is a dummy.

In addition, four terminals are arrayed on a third side. The terminals on the third side are the terminals E, P, F, and B electrically connected to the terminals E, P, F, and B on the first side.

The terminals L, S on the second side, and the terminals E, P, F, and B on the third side are connected to respective connection terminals of the IC casing 170 shown in FIG. 5, by welding.

An opening 152 in which is exposed a part of conductors connected to the SW1 and SW2 terminals is formed in part of the resin section of the intermediate terminal 150. Each terminal is formed from a material of iron or phosphor bronze, with a thickness of about 0.5 to 0.3 mm. The conductors exposed in the opening 152, therefore, can be easily cut midway. The conductors exposed in the opening 152 are equivalent to the cutoff portions CP1, CP2 of the intermediate terminal 150, shown in FIG. 1.

Next, connection patterns of the conductors for the connection of each terminal of the intermediate terminal 150 are described below with reference to FIGS. 7A to 7D.

The intermediate terminal 150 has its internal conductor layers formed using progressive dies. A first layer is formed from the conductor for connecting the appropriate terminals S, L, E, P, and F. The SW1 and SW2 terminals are both connected to the terminal E on the third side. A second layer is the conductor for interconnecting the terminals B.

FIG. 7A shows a state under which the SW1 and SW2 terminals are usually connected to the terminal E. Since the SW1 and SW2 terminals are connected to the terminal E, that is, GND, these connections mean a combination in which the LRC function and the terminal-S disconnection alarm function are both limited (inhibited).

FIG. 7B shows an open state under which the SW1 terminal is disconnected from the terminal E, at the cutoff portion CP1 of the opening 152. In this case, only the LRC function is not limited (inhibited).

FIG. 7C shows an open state under which the SW2 terminal is disconnected from the terminal E, at the cutoff portion CP2 of the opening 152. In this case, only the terminal-S disconnection alarm function is not limited (inhibited).

FIG. 7D shows an open state under which the SW1 and SW2 terminals are disconnected from the terminal E, at the cutoff portions CP1 and CP2, respectively, of the opening 152. In this case, neither the LRC function nor the terminal-S disconnection alarm function is limited (inhibited).

In this way, the limitation (inhibition) of either the LRC function or the terminal-S disconnection alarm function or both can be executed by cutting or leaving connected the cutoff portions CP1, CP2 in the intermediate terminal 150. This means that the functions desired by the user can be limited (inhibited) very easily just by cutting or leaving connected the cutoff portions.

The above description indicates that whether the cutoff portion CP1 is cut determines whether a first function is executed, and that whether the cutoff portion CP2 is cut determines whether a second function is executed, and the cutoff portions CP1, CP2 are each used to determine whether a specific function is to be executed.

In contrast to the above, one function can be switched to four kinds of states by combining whether the two cutoff portions, CP1 and CP2, are to be cut. For example, it is possible to select four different sets of electrical characteristics by expressing in terms of 1 or 0 whether the SW1 and SW2 terminals are to be disconnected from or connected to GND.

First, a first example is described below using Table 1.

TABLE 1

| SW1 | 0 | 0 | 1 | 1 |
|---|---|---|---|---|
| SW2 | 0 | 1 | 0 | 1 |
| Speed at charge lamp turn-off | 680 rpm | 800 rpm | 1050 rpm | 1450 rpm |

Table 1 indicates that the generator speed at which the charge lamp turns off during a start of the internal-combustion engine is changed from 680 rpm to 1,240(?) rpm, for example. More specifically, when both SW1 and SW2 terminals are open, the generator speed at which the charge lamp turns off during the start of the internal-combustion engine is defined as 680 rpm. In addition, when the SW1 terminal is open and the SW2 terminal is connected to GND, the generator speed at which the charge lamp turns off during the start of the internal-combustion engine is defined as 800 rpm. Furthermore, when the SW1 terminal is connected to GND and the SW2 terminal is open, the generator speed at which the charge lamp turns off during the start of the internal-combustion engine is defined as 1,050 rpm. Moreover, when both SW1 and SW2 terminals are connected to GND, the generator speed at which the charge lamp turns off during the start of the internal-combustion engine is defined as 1,450 rpm.

In general, an internal-combustion engine and a generator are connected via respective pulleys, a diameter ratio of the pulleys varies from user to user. Even in this case, the generator speed at which the charge lamp turns off can be changed in the first example, so the charge lamp can be deactivated at a constant engine speed, irrespective of the pulley ratio.

In addition, a change in charge lamp state from "on" to "off", that is, a change in terminal-L voltage from LOW to HIGH can be used as a restart inhibition signal for a starting motor.

Next, a second example is described below using Table 2.

TABLE 2

| SW1 | 0 | 0 | 1 | 1 |
|---|---|---|---|---|
| SW2 | 0 | 1 | 0 | 1 |
| Rotational Speed at charge lamp turn-off | 680 rpm | 800 rpm | 1050 rpm | 1450 rpm |
| Rotational Speed at LRC activate | Below 2400 rpm | Below 2600 rpm | Below 2800 rpm | Below 3000 rpm |

Table 2 shows an example of creating setup variations for the function that deactivates the LRC function at a generator speed exceeding a preset value. More specifically, when both SW1 and SW2 terminals are open, the LRC function is deactivated at a generator speed exceeding 2,400 rpm. In addition, when both SW1 and SW2 terminals are connected to GND, the LRC function is deactivated at a generator speed exceeding 3,000 rpm.

Next, assembly structure of the automobile battery-charging generator control device 100 of the present embodiment is described below with reference to FIGS. 8 to 10.

Figure 8:
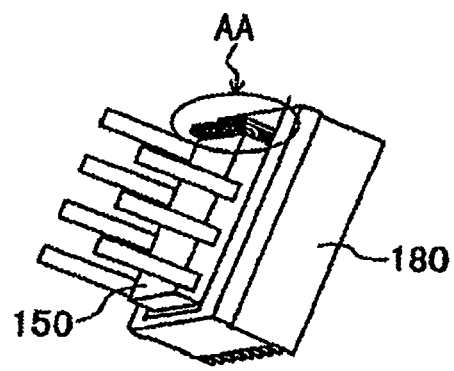
FIG. 8 is an explanatory diagram of assembly structure of the automobile battery-charging generator control device according to the present embodiment.
Figure 9:
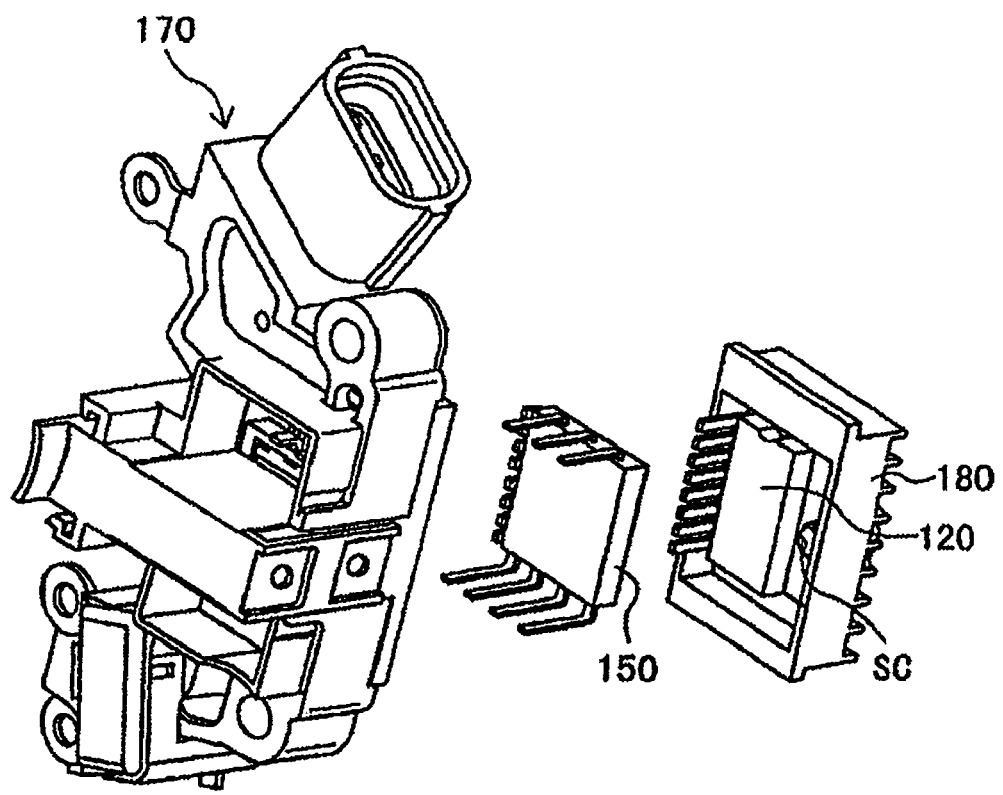
FIG. 9 is another explanatory diagram of the assembly structure of the automobile battery-charging generator control device according to the present embodiment.
Figure 10:
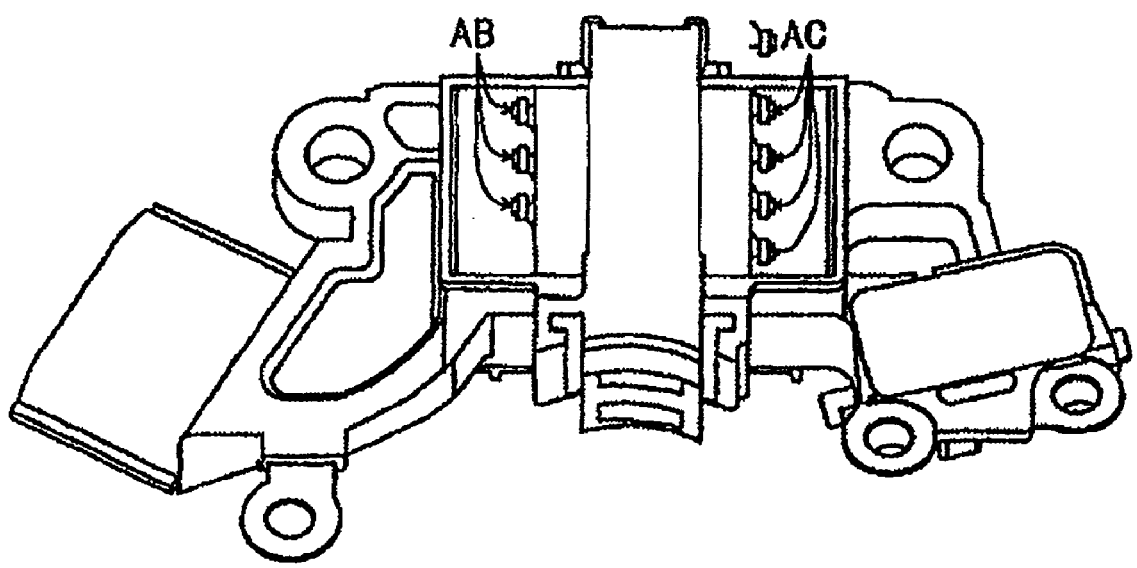
FIG. 10 is yet another explanatory diagram of the assembly structure of the automobile battery-charging generator control device according to the present embodiment.

FIGS. 8 to 10 are explanatory diagrams of the assembly structure of the automobile battery-charging generator control device according to the present embodiment. The same reference numbers or symbols as used in FIG. 5 denote the same elements.

As shown in FIG. 8, the voltage control IC regulator 120 is fixed to the heat sink 50 via the screw SC.

After this, as shown in FIG. 9, the eight terminals of the voltage control IC regulator 120 are connected to eight respective terminals of the intermediate terminal 150, at a section AA, by welding.

Next, as shown in FIG. 10, three terminals of the intermediate terminal 150 are connected to three respective terminals of the IC casing 170, at a section AB, by welding, and four terminals of the intermediate terminal 150 are connected to four respective terminals of the IC casing 170, at the section AC, by welding.

The IC casing 170 here is the same type as used in conventional control devices for automobile battery-charging generators.

Conventional control devices for automobile battery-charging generators use a hybrid IC regulator. Seven pads for welding are fixed to a ceramic substrate of such a hybrid IC regulator by solder connection. Each of the pads has a welded wire, and the seven wires are connected to each terminal of an IC casing by welding.

More specifically, the IC casing 170 used in the conventional control device for automobile battery-charging generators includes three connection terminals and four connection terminals arranged in parallel at the welds AB and AC, respectively, as shown in FIG. 10.

Meanwhile, as described with reference to FIG. 4, the voltage control IC regulator 120 used in the present embodiment has the structure of the single in-line package mounted on a molded package with eight terminal pins. The terminals of the voltage control IC regulator 120, therefore, cannot be connected directly to the connection terminals of the IC casing 170. In contrast to this, use of the intermediate terminal 150 described per FIGS. 5 and 8 makes the voltage control IC regulator 120 connectible to the IC casing 170 by changing the terminal shape from the single eight-terminal array on the voltage control IC regulator 120 to the parallel arrangement of the three-terminal set and four-terminal set in the IC casing 170. In addition, as described per FIG. 7, the intermediate terminal 150 includes the cutoff portions CP1 and CP2, so the intermediate terminal 150 can be used to determine whether different functions can be executed, from the states of the SW1 and SW2 terminals.

As set forth above, combination of the conventional IC casing 170 and the intermediate terminal 150 makes it unnecessary to dispose a new IC casing and possible to mount the voltage control IC regulator 120 whose structure is different from that of the conventional hybrid IC regulator.

The intermediate terminal 150 allows a molding cost to be reduced, since the terminal itself can be formed using one mold.

The voltage control IC regulator 120 and the intermediate terminal 150 incorporate a number of functions. Combining these elements in the above fashion allows significant cost reduction and response to user needs for application to other vehicle models and/or for functional additions.

As described per FIG. 4, the voltage control IC regulator 120 has a single in-line package structure formed on a molded package having eight terminal pins, and as described per FIG. 7, the intermediate terminal 150 includes cutoff portions CP1 and CP2 midway in the arrangement of multiple terminals. However, other configurations are adoptable as alternatives.

By way of example, the integrated circuit of the voltage control IC regulator 120 is useable in a state of a bare chip. The bare chip in this example has a pad constructed to connect to the GND terminal of the IC casing via an aluminum wire or a metallic wire. Whether an internal function of the voltage control IC regulator 120 is to be made effective or limited can be selected by leaving the wire connected or cutting it, respectively.

As described above, the present embodiment assigns a plurality of functions to one semiconductor element, distinguishes the effective or limited states of the assigned functions by the states of the switch terminals mounted on the semiconductor element, and thus provides the specifications that match the particular needs of the user. Accordingly, applicability to a variety of vehicle models can be obtained, switching from one function to another is simplified, and the applicability of the semiconductor element, as well as of the package, to other vehicle models allows cost reduction based upon a mass-production effect.

What is claimed is:

1. A control device for an automobile battery-charging generator, used in conjunction with the charging generator that includes a field winding which creates a rotating magnetic field by spinning synchronously with rotation of an internal-combustion engine, and an armature winding influenced by the field winding to generate an electric current, the control device comprising:
   a rectifier for rectifying alternating-current power generated in the armature winding; and
   voltage-regulating means for controlling a field current flowing through the field winding, in response to a voltage of a battery charged by direct-current power resulting from the rectification by the rectifier;
   wherein the voltage-regulating means includes a function that assigns a plurality of electrical characteristics limits or electrical characteristics beforehand, the voltage-regulating means further including a switch terminal to select whether the function that assigns the plurality of electrical characteristics limits or electrical characteristics is to be made effective or ineffective.

2. The control device for the automobile battery-charging generator according to claim 1,
   wherein by taking one of two electric potential levels, the switch terminal selects whether the electrical characteristics limits or the electrical characteristics are to be executed.

3. The control device for the automobile battery-charging generator according to claim 1,
   wherein the switch terminal is disposed in at least two places, in which case, combining the two electric potential levels of each of the switch terminals switches the electrical characteristics limits or the electrical characteristics appropriately according to the particular number of combinations.

4. The control device for the automobile battery-charging generator according to claim 1,
   wherein the switch terminal is integrated in an insulator-isolated integrated circuit or in an integrated circuit with bipolar, C-MOS, and D-MOS regions formed as a single block.

5. The control device for the automobile battery-charging generator according to claim 1,
   wherein the voltage-regulating means is formed into a single in-line package structure having connection terminals arranged at one side of the package structure so as to include the switch terminal;
   the voltage-regulating means of the single in-line package structure is connected to a holder via an intermediate terminal;
   the intermediate terminal is formed as an insert-molded package having connection terminals arrayed in at least two directions, the connection terminals in one of the two directions being connected to the connection terminals of the voltage-regulating means of the single in-line package structure, and the connection terminals in the other direction being connected to connection terminals of the holder; and
   the connection terminals of the holder are connected to the battery, the field winding, and GND.

6. The control device for the automobile battery-charging generator according to claim 5,
   wherein the intermediate terminal includes an opening with a portion of each connection terminal exposed therein, in part of the insert-molded package; and
   an electric potential of the switch terminal for switching the electrical characteristics limits or the electrical characteristics is changed from a first level to a second level by cutting the exposed connection terminal within the opening.

7. The control device for the automobile battery-charging generator according to claim 5,
   wherein the intermediate terminal includes the connection terminals in three directions on an outer surface of the insert-molded package;
   the connection terminals arrayed at both ends of the intermediate terminal are connected to the connection terminals of the holder; and
   the remaining connection terminals are connected to the connection terminals of the voltage-regulating means of the single in-line package.

* * * * *